May 30, 1961 B. BARÉNYI 2,986,419
GUARD RAIL FOR AUTOMOBILES
Filed May 20, 1955
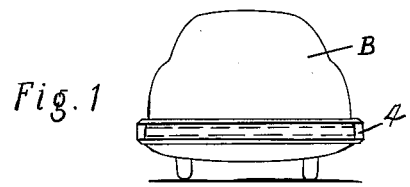
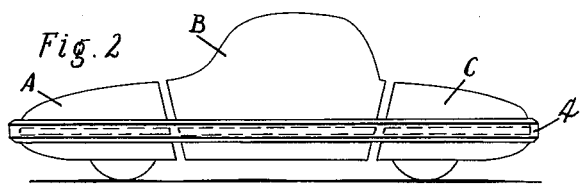
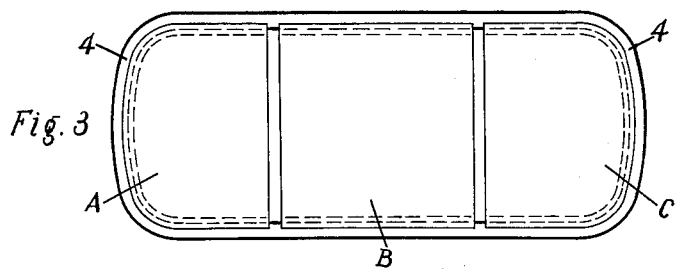
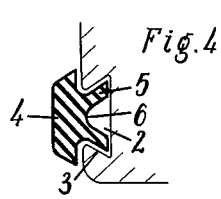 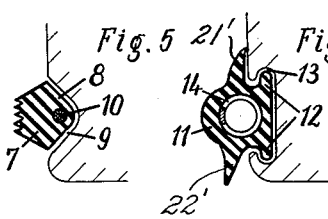 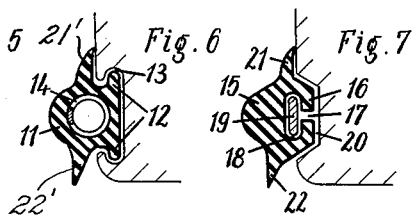
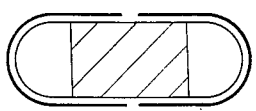 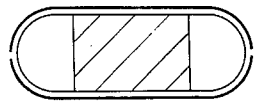 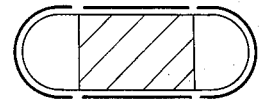
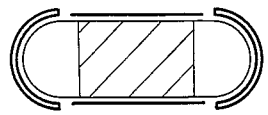 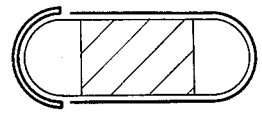
INVENTOR
BÉLA BARÉNYI
BY Dicke and Craig.
ATTORNEYS.

United States Patent Office 2,986,419
Patented May 30, 1961

2,986,419
GUARD RAIL FOR AUTOMOBILES
Béla Barényi, Steckfeldstrasse 16, Stuttgart-Hohenheim, Germany
Filed May 20, 1955, Ser. No. 509,912
In Germany Mar. 18, 1949
Public Law 619, Aug. 23, 1954
Patent expires Mar. 18, 1969
6 Claims. (Cl. 293—62)

The present invention relates to improvements in automobiles, and more particularly to a guard rail or the like extending entirely around the outside of the car so as to protect the same at all points in any kind of collision or even when coming into lateral contact with other objects, such as when parking the car or driving it into a garage, or when being side-swiped by another car.

Guard rails or protective ledges of this general type which have been used on cars prior to this invention usually consisted of resilient strips of metal, rubber, or a combination of rubber and metal. They were either mounted on the car similar to the customary bumpers, that is, by means of special connecting members so as to extend a certain distance away from the car body, or directly on the car body by means of bolts extending from the inside of the body and secured at such points. If damaged, such rails or ledges or parts thereof are very difficult to replace since the points of securement thereof on the car are rather inaccessible and often severely corroded.

It is an object of the present invention to provide a guard rail or ledge which essentially consists of rubber or a similar elastic material and eliminates the disadvantages of similar rails as previously applied by being mounted directly on the car body or chassis and by being secured thereto so as to be easily disconnected therefrom from the outside.

Another object of the present invention resides in the provision of a groove or channel extending along the outside of the metal covering of a car body or chassis and designed to serve as a means for locating and securing a guard rail on the car.

Another object of the present invention is to provide a guard rail of a material which either by its own elasticity and tension or by the added provision of cords, cables, or metal bands embedded within such ledge adheres to the car body or chassis of its own accord and substantially without any of the conventional securing means, such as bolts, rivets, and the like.

A further object of the present invention is to provide a guard rail for an automobile which may either form an endless band and extend entirely around the car body, or may consist of a plurality of sections which are either interconnected or individually secured to the car body at particular parts thereof. Also, the guard rail according to the invention may be of a uniform cross-sectional size and shape throughout its length or of different size and shape at different parts of the car depending upon their exposure to damage. Thus, for example, the portions of the rail designed to protect the front and rear ends of the car and serving as bumpers may be made of thicker elastic material than the side portions and may also be provided with suitable reinforcements.

Further objects, features and advantages of the present invention will be apparent from the following detailed description thereof, as well as from the accompanying drawings, in which Figs. 1, 2 and 3, respectively, show rear, side, and top views of an automobile of the cellular-type of construction with a guard rail or lodge according to the invention applied thereto;

Fig. 4 shows a partial cross-sectional view through a portion of the construction of the guard rail and groove or channel provided in the body of a car according to Figures 1 to 3;

Figs. 5 through 7 show partial cross-sectional views similar to Figure 4 of different modifications of the guard rail and respective grooves or channel portions provided in the body or chassis of a car for locating and securing the guard rails; and Figs. 8 to 12, respectively, show diagrammatically the application of guard rails in a plurality of sections to a car body or chassis.

Referring to the drawings, Figs. 1, 2, and 3 illustrate a car built according to the cellular-type of construction and consisting of the front, central, and rear cells A, B, and C, respectively, with the guard rail 1 according to the invention extending entirely around the periphery of the car body and mounted directly thereon.

For this purpose, as shown in Figs. 4 to 7, a groove or channel of a cross-sectional shape depending upon the shape, size, and particular construction of the guard rail is provided along the length of the car, and the base portion of such guard rail is inserted in such groove so as to locate the same in a fixed position.

The guard rail according to the invention may be made in many different embodiments, only a few of which are shown in the drawings. Thus, according to Fig. 4, which shows in detail the guard rail 4 illustrated in Figures 1 to 3, the channel 2 in the metal covering of the car body may be of swallowtail shape with undercut lateral surfaces 3. The guard rail 4 which is preferably made of rubber or a rubber substitute with adequate resilient qualities is provided with a base portion 5 which serves as anchoring means for the guard rail 4 in the groove or channel provided in the vehicle body and which is likewise of substantially swallowtail-like shape and provided with a hollow portion 6 intermediate its two legs. For inserting the guard rail 4 into the channel 2, the two leg strips are pressed together and thus easily pass through the narrower mouth of the channel. They will then by their own resilience snap back into their normal extended position to engage with the undercut surfaces 3 of the channel. A guard rail according to this embodiment is especially adapted to be applied either as an endless belt as shown in Figs. 1 to 3, or in individual strips of any suitable length. If used as an endless belt, it should be of a length slightly smaller than the periphery of the channel 2 which then extends all around the car, so that it has to be slightly stretched to be put in place. The tension of such endless belt will then materially contribute to the function of the swallowtail-like shape of the base 5 to maintain the guard rail in a fixed position on the car.

According to the embodiment shown in Fig. 5, the base portion 8 of the guard rail 7 and the corresponding channel 9 are of substantially rectangular cross section. Thus, there are no projections on the base portion 8 to maintain the rail of its own accord within the channel 9 and for its securement on the car body, it must either be made as an endless belt of smaller inner peripheral length than channel 9 and stretched when being applied, so as to be held in channel 9 by its own tension, or when made in the form of strips, it should be similarly stretched and its ends secured to the body of the car. For reinforcing the rail 7 and increasing its tendency to stay within the channel 9, or to resist any outside force tending to pull it out of channel 9, a cord or steel cable 10 may be embedded therein or be inserted in a suitable hole provided for that purpose, preferably within the base portion 8.

The embodiment as shown in Fig. 6 is similar to that shown in Fig. 4 insofar as the channel 13 is undercut and thus provided with gripping surfaces engaging two flanged portions 12 of the guard rail 11, the two flange portions 12 thereby serving as anchoring means for the guard rail 11 in the channel 13 provided in the vehicle body. For increasing the resilient tension of the material and its tendency to remain within the channel 13, a coil spring 14 is inserted or embedded within the body of the guard rail 11.

The embodiment as shown in Fig. 7 is again similar to that shown in Fig. 5 insofar as the channel 20 is not provided with any gripping edges to retain the guard rail 15 in a fixed position. Therefore, a substantially T-shaped recess is provided in the flattened base portion 16 of the rail 15 such recess consisting of a flat groove 18 and a slit or opening 17 facing the center of the channel 20. A steel ribbon 19 may be inserted through the opening 17 into the groove 18 to reinforce the rail 15.

Further, the upper edge of the rail 15 of the embodiment according to Fig. 7 is shown as being provided with a lip 21 which has an effect similar to a suction cup in that the feathered upper edge thereof through the resiliency of the material presses against the outer wall of the car body, thus preventing any water flowing down along the outer surface of the car body during a rain, or when the car is being washed, from entering the channel 20 behind the base 16 of the rail 15. The lower edge of the rail 15 may also be provided with a similar lip 22 which, however, is formed as a drip edge and thus not made to cling to the outer surface of the car body. Similar ribs or lips may also be provided on any of the other embodiments shown in Figs. 4 to 6, as shown, for example, in connection with Figure 6 in which the guard rail is provided with an upper lip 21' and a lower lip 22' which function in the same manner as lips 21 and 22 described in connection with Figure 7.

The particular shape of the longitudinal channel provided in the outer covering of the car, or of either the base or the outer portion of the guard rail may be of any suitable design, as this is indicated in Figs. 4 to 7. Furthermore, various other methods than those shown in the drawings of securing the guard rail to the car body may be applied and the invention is by no means limited to the particular forms shown in the drawings. Also, as previously indicated, the guard rail may be either an endless belt extending around the entire car, as shown in Figs. 1 to 3, or be applied thereto in sections or strips. Particularly, if the car consists of several sections built individually according to the cellular method of construction and subsequently assembled, each section may carry its own strip of guard rail, the outer ends of which may then preferably be secured to the car body. Such securement of the outer ends is necessary particularly if the guard rail is to be applied, and rest within its channel under a resilient tension.

Also, to permit an easier replacement of damaged portions of a guard rail, such as illustrated in Figures 4 to 7 especially at those parts of the car which are more easily subject to damage than others, that is, especially at the front and rear of the car where the guard rail may replace the customary bumpers, it may be advisable to make it of several sections, as this has also been indicated in Figs. 8 to 12. Such specially exposed portions of the car may also be provided with thicker rail sections, and the various sections may be either attached to each other so as to form an endless belt or be individually secured to the car body.

The material of which the guard rail or rails are made preferably consists of solid rubber or any other suitable material of adequate resilience. Also, air chambers or air cushions may be provided therein as is frequently done today to increase the resilience of similar structures.

Although my invention has been illustrated and described with reference to the preferred embodiments thereof I wish to have it understood that it is in no way limited to the details of such embodiments or to the specific examples described, but is capable of numerous modifications with the scope of the appended claims.

Having thus fully disclosed my invention, what I claim is:

1. In combination with an automobile body having a groove within its outer body covering conforming to the shape of the outer face of the body and located in a substantially horizontal plane at the greatest girth of the body, a flexible and resilient guard rail mounted directly on said body along said groove and being replaceable from the outside thereof, said guard rail being so constructed and arranged with at least a portion thereof lying within said groove as to be self-holding on said body, a tensioned coil spring imbedded within said guard rail and extending longitudinally thereof, said coil spring being elastically deformable in all directions 2. In combination with an automobile body having a groove within its outer body covering conforming to the shape of the outer face of the body and located in a substantially horizontal plane at the greatest girth of the body, a flexible and resilient guard rail mounted directly on said body along said groove and being replaceable from the outside thereof, said groove having lateral surfaces which are undercut, said rail forming a continuous belt around said body, said rail when unstretched being smaller in length than the girth of the groove, said guard rail being so constructed and arranged with at least a base portion thereof lying within said groove as to be self-holding on said body and including laterally projecting members of swallowtail shape extending outwardly into said undercut portions of the groove to help retain the rail therein.

3. In combination with an automobile body having a groove within its outer body covering conforming to the shape of the outer face of the body and located in a substantially horizontal plane at the greatest girth of the body, a flexible and resilient guard rail mounted directly on said body along said groove and being replaceable from the outside thereof, said guard rail being so constructed and arranged with at least a portion thereof lying within said groove as to be self-holding on said body, and the outer portion of said guard rail having at least one longitudinally extending lip projecting laterally therefrom, said lip being adapted to cling along the outer surface of said body to prevent water from entering into said groove.

4. In combination with an automobile body having a groove within its outer body covering conforming to the shape of the outer face of the body and located in a substantially horizontal plane at the greatest girth of the body, a flexible and resilient guard rail mounted directly on said body along said groove and being replaceable from the outside thereof, said guard rail being so constructed and arranged with at least a portion thereof lying within said groove as to be self-holding on said body, and the outer portion of said guard rail having a longitudinally extending lip projecting laterally in downward direction therefrom and being adapted to serve as a drip edge.

5. In combination with an automobile body having a groove provided within at least two substantially oppositely spaced surfaces of its outer body covering, each portion of said groove conforming to the shape of the outer face of the body and located in a substantially horizontal plane at the greatest girth of the body, flexible and resilient guard rail means mounted directly on said body along each groove portion and being replaceable from the outside thereof, each groove portion having lateral surfaces which are undercut, said guard rail means when unstretched being smaller in length than the groove in which it is secured, said guard rail means being so constructed and arranged with at least a base portion thereof lying within said groove as to be self-holding on said body and including laterally projecting members of swallowtail shape extending outwardly into said undercut portions of the groove to help retain the rail therein.

6. In combination with an automobile body having an outer body covering with a groove in at least two substantially oppositely spaced surfaces of said outer body covering conforming to the shape of the outer face of the body and located in a substantially horizontal plane at the greatest girth of the body, each portion of said groove being defined at its face by surfaces which are undercut relative to the outer body covering surface, flexible elastic strip means lying partially wtthin each groove portion and at least partially encircling said body, said strip means being longitudinally tensioned in said groove and including lateral portions interlocking with the lateral undercut surfaces of said groove, whereby the tension of said strip means and the interlocking of said surfaces each aid in retaining the strip in the groove, and a tensioned spring means extending longitudinally within said strip means and being elastically deformable in all directions, said spring means serving to reinforce said guard rail and to further aid in retaining the strip means in the groove.

References Cited in the file of this patent

UNITED STATES PATENTS

| | | |
|---|---|---|
| 981,260 | Harris | Jan. 10, 1911 |
| 1,457,259 | Malluk et al. | May, 29, 1923 |
| 1,565,023 | Moyer | Dec. 8, 1925 |
| 1,566,839 | Denels | Dec. 22, 1925 |
| 1,649,166 | Kahil | Nov. 15, 1927 |
| 1,667,561 | Mediavilla | Apr. 24, 1928 |
| 1,754,112 | Lusse | Apr. 8, 1930 |
| 1,858,743 | Langstreth | May 17, 1932 |
| 1,936,113 | Jelliffe | Nov. 21, 1933 |
| 1,937,287 | McGee | Nov. 28, 1933 |
| 2,119,429 | Fletcher | May 31, 1938 |
| 2,186,505 | Tibbetts | Jan. 9, 1940 |
| 2,330,684 | Colling | Sept. 28, 1943 |

FOREIGN PATENTS

| | | |
|---|---|---|
| 3700/31 | Australia | Mar. 31, 1932 |
| 595,278 | Germany | Apr. 5, 1934 |
| 296,251 | Italy | May 12, 1932 |
| 339,786 | Italy | Apr. 28, 1936 |
| 404,277 | Italy | June 5, 1943 |